No. 757,242.

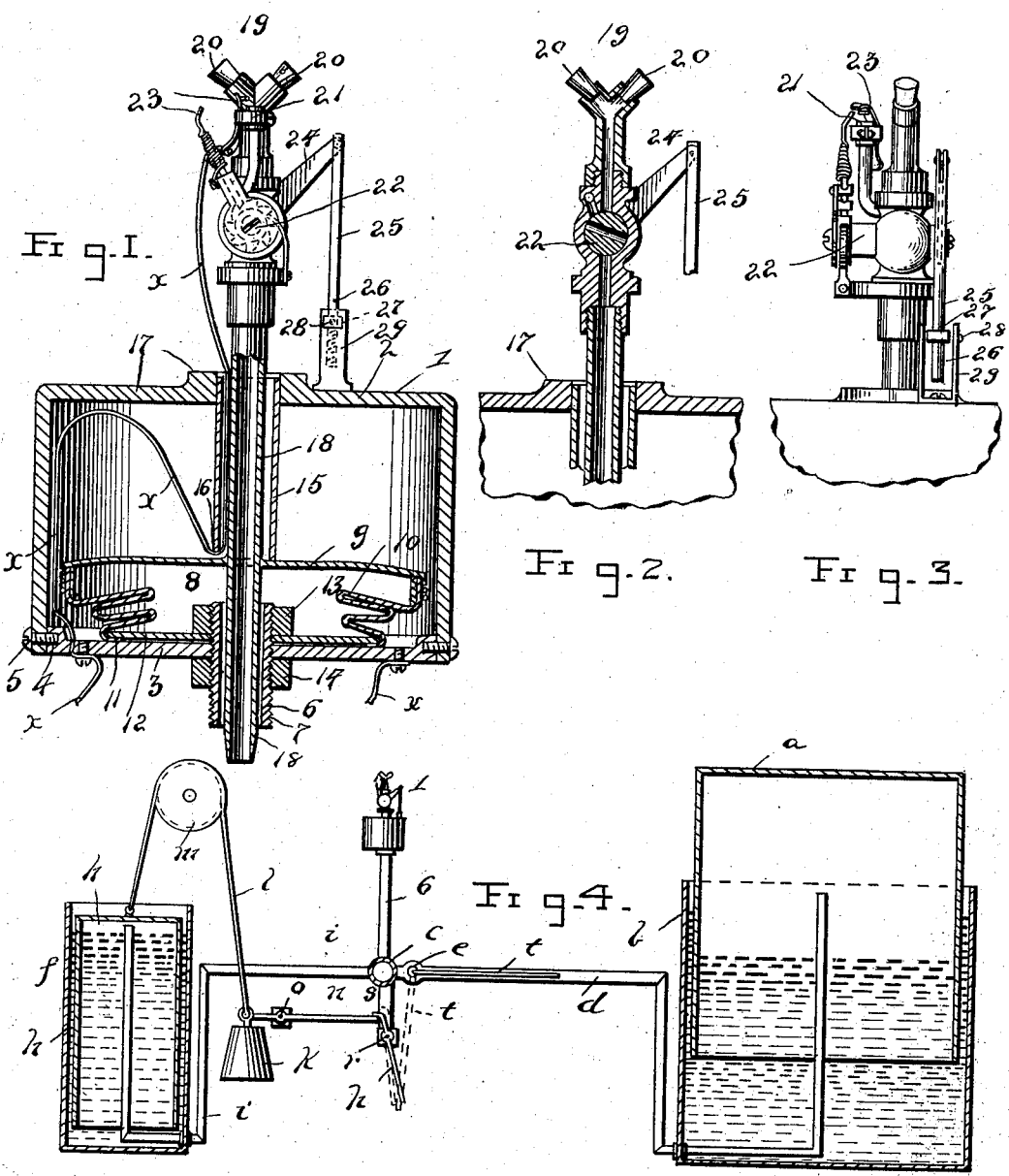

Patented April 12, 1904.

UNITED STATES PATENT OFFICE.

ELI H. STOW, OF BINGHAMTON, NEW YORK.

AUTOMATIC GAS IGNITING AND EXTINGUISHING APPARATUS.

SPECIFICATION forming part of Letters Patent No. 757,242, dated April 12, 1904.

Application filed July 30, 1903. Serial No. 167,650. (No model.)

*To all whom it may concern:*

Be it known that I, ELI H. STOW, a citizen of the United States, residing at Binghamton, in the county of Broome and State of New York, have invented certain new and useful Improvements in Automatic Gas Igniting and Extinguishing Apparatus; and I do declare the following to be a full, clear, and exact description of the invention, such as will enable others skilled in the art to which it appertains to make and use the same.

My invention is an improved automatic gas igniting and extinguishing apparatus; and it consists in the construction and combination of devices hereinafter described and claimed.

One object of my invention is to combine with a self-igniting gas-burner improved means to automatically operate the same.

A further object of my invention is to combine with a casing a gas-pressure-operated device therein, a burner carried by and movable with the gas-pressure-operated device and having a valve, and a connection between the casing and the valve to automatically operate the latter by the movement of the burner.

A further object of my invention is to combine with a self-igniting gas-burner having an operating element movable by gas-pressure in one direction improved means for cutting off the supply of gas and for creating back pressure to instantly move said operating element in the reverse direction, and thereby immediately extinguishing the gas-jet at the burner.

A further object of my invention is to combine with a gas-burner means to cut off the supply of gas thereto and means to exhaust the gas from the burner and cause the immediate extinction of the flame.

In the accompanying drawings, Figure 1 is a sectional view of a gas igniting and extinguishing apparatus embodying my improvements. Figs. 2 and 3 are detail sectional views of the same. Fig. 4 is a diagrammatic sectional view of the entire apparatus, including the means to cut off the supply of gas to the burner and to create back pressure to cause the gas to be immediately extinguished.

My improved apparatus is especially adapted for use in connection with acetylene-gas burners, but may be also used in connection with burners which consume other kinds of gas.

In the embodiment of my invention here shown I provide a casing 1, which is formed with a closed head 2 at its upper side and has its lower end open and adapted to be closed by the head 3. The latter is of a size and shape to enable it to be fitted in the lower end of the casing, and is formed with an annular peripheral groove 4 to receive the points of screws 5, with which the casing 1 is provided, said screws coacting with said groove to detachably secure the head 3 in the lower end of the casing. Through a central opening in the lower head 3 extends one end of a gas supply or service pipe 6. That portion of the same which passes through said opening is externally screw-threaded, as at 7. Within the casing is a device 8, which is adapted to be operated by gas-pressure, the said device comprising a movable head or diaphragm 9 and a flexible wall 10, which depends from the same and is preferably made of leather. It may be made of any other suitable material within the scope of my invention. The said flexible wall 10 forms the barrel of the gas-pressure operated and receiving device, and the said barrel tapers downwardly, as shown, so that its lower end is of less diameter than its upper end. The lower end of the wall or barrel 10 is inturned to form a flange 11, which bears on the head 3 around the inner end of the gas-service pipe 6. A disk or washer 12, through which the said pipe 6 passes, bears on the said flange 11, and a nut 13 is screwed on the said pipe and bears on the said disk or washer. A clamp-nut 14 is screwed to the pipe 6, bears against the lower or outer side of the head 3, and coacts with the head, the washer 12, and the nut 13 to firmly and securely clamp the flange 11 between the head and the disk or washer, and thereby effect a gas-tight connection between them. A guide-tube 15 has its lower end secured to the head or diaphragm 9, but the same does not extend therethrough and does not communicate with the interior of the gas-pressure-operated device 8. The said guide-tube is provided at its lower or inner end with suitably-disposed openings 16. The said guide-tube operates and is slidable in and extends through a central opening 17 in the closed head 2 of the casing 1. A gas-pipe 18, of reduced diameter as compared with the guide-tube and of suitable length, passes through and is secured to the head or diaphragm 9. The upper portion of the said pipe 8 passes through and projects beyond the guide-tube, and the lower portion thereof operates in the upper end portion of the service-pipe 6. The said pipe 18 serves to supply gas from the service-pipe to the burner 19, which is secured to the upper end of the said pipe 18. The said pipe 18 forms an element of the gas-pressure-operated device 8, being connected to the head or diaphragm 9 of said device, rises and falls with said head, and the burner being attached to the upper end of the said pipe 18, hence is carried by and movable with the gas-burner-operated device and rises and falls bodily with the head 9 of said device. The burner 19, here shown, is of the usual construction, 20 being the jet-tips, 21 the pilot-burner, 22 the valve-plug to supply gas to the pilot-burner and jet-tips and to extinguish the pilot-burner if the jet-tips are ignited, and 23 being the electrodes of an electric sparking apparatus, one of said electrodes being carried by and moved by the valve-plug. The function of these electrodes, as will be understood, is to create an electric spark when the gas is turned on to ignite the gas which issues from the pilot-burner, the latter serving to ignite the gas which issues from the jet-tips.

In carrying out my invention I provide the gas-burner valve with an operating-arm 24. A link 25 has its upper end pivotally connected to the outer end of said operating-arm. The lower portion of the said link is screw-threaded, as at 26, and provided with an adjusting yoke-nut 27, provided with a trunnion 28, the latter forming a pivotal connection between the yoke-nut and a standard or keeper 29, which is secured on the head 2 of the casing 1. Hence when the burner is moved upwardly by the pressure of gas in the device 8 the connections hereinbefore described between the burner-valve and the casing 1 automatically turn the burner-valve to cause gas to be supplied successively to the pilot-burner and the jet-tips and then cut off from the pilot-burner, while maintaining the supply of gas to the jet-tips. It will be understood that when the burner descends, together with the head 9 of the gas-pressure-operated device 8, said connections between the casing 1 and the gas-burner valve automatically actuate the latter to cut off the supply of gas to the jet-tips.

The guide-tube which operates in the opening of the upper head of the casing 1 steadies the motion of the diaphragm of the device and prevents it from wabbling. The conducting-wires x of the sparking apparatus pass through the guide-tube, out through the openings at the lower end thereof, into the casing 1, and are secured to the lower head of the casing by binders, as shown. By making the flexible wall of the device 8 of truncated conical form with its contracted end lowermost, as hereinbefore described, the said device is rendered very sensitive to the action of the back pressure from the exhauster hereinafter described, so that it operates quickly to lower the burner, close the valve thereof, and extinguish the flame when the supply of gas to the service-pipe is cut off.

I will now describe a novel form of apparatus to exhaust the gas from the burner when the supply of gas to the burner is cut off, and thereby cause immediate extinction of the flame.

In the diagram Fig. 3 a gas-storage bell is indicated at $a$ in a water-sealed vessel $b$. The gas-main $c$, to which the service-pipe 6 is attached, is connected by a pipe $d$ with the gas-space of the storage-bell, and this connection includes a valve $e$. An exhauster or back-pressure apparatus is indicated at $f$ as comprising a sealed vessel $g$ and a bell $h$, the latter being, in effect, a piston and the sealed vessel $g$ being, in effect, a cylinder. An exhaust-pipe $i$ leads from the main $c$ to the space in the exhaust-bell above the water-level. It will be understood that a number of the service-pipes 6 will be connected with the main, so that a plurality of the burners will be simultaneously operated, the system being extended to any desired extent, according to the number of burners therein.

A weight $k$ is connected by a cord $l$ to the exhaust-bell $h$ and is here shown as passing a direction-sheave $m$. Normally the weight is supported in an elevated position to dispose the exhaust-bell in a lowered position by a pivoted supporting element $n$, the pivot of the latter being indicated at $o$. A detent $p$, which is here shown as pivoted, as at $r$, and provided at one end with a hook $s$, engages said hook with one end of the weight-support $n$ to maintain the latter in the required position to support the weight. The valve $e$, which supplies the main with gas from the storage-bell $a$, may be operated manually or by a time apparatus set to operate at any desired hour. The said valve is provided with a tappet-arm $t$, which when the valve is turned in the position required to cut off the supply of gas to the main, and hence to the burner connected thereto by the service-pipe 6, strikes the detent $p$ and disengages the hook $s$ of the latter from the weight-holder $n$, and the latter immediately drops the weight. As the weight drops it raises the exhaust-bell $h$ and causes the latter to exhaust through the pipe $i$, the main, and the service-pipe 6. It will be understood that the closing of the valve $e$ immediately prior to the operation of the exhauster cuts off the pressure of gas in the device 8 and at the burner, and hence the action of the exhauster $f$ is to exhaust the gas from the device 8 and the burner, causing the latter to descend instantly and swiftly, its valve to be closed, and the gas between said valve and the jet-tips to be instantly exhausted, so that the flame is instantly extinguished.

Heretofore, so far as I am aware, devices of this character have employed weights or springs to move the gas-burner-operated device in the reverse direction when the gas-pressure is pretermitted. Owing, however, to the pressure of gas in such gas-pressure-operated devices their action has been necessarily slow, so that some time must expire before the flame becomes entirely extinguished, causing the flame to dwindle somewhat slowly, the resulting imperfect combustion of the gas at the burner-tip facilitating the deposit of carbon therein, with the result that the burner-tip becomes speedily choked.

My improved apparatus provides means for exhausting the gas from the gas-pressure-operated device, so that the flame becomes instantly extinguished at the burner and the same is prevented from being clogged by such deposits.

I do not desire to limit myself to the precise construction and combination of devices herein shown and described, as it is evident that modifications may be made therein without departing from the spirit of my invention and within the scope of the appended claims.

Having thus described my invention, what I claim, and desire to secure by Letters Patent, is—

1. In combination with a gas-burner, means to cut off the supply of gas thereto and means to exhaust gas from the burner and cause immediate extinction of the flame.

2. In an apparatus of the class described, the combination of a casing, a gas-pressure-operated device therein, a burner carried by and movable with the said gas-pressure-operated device and having a valve disposed externally of the casing, and a connection between the casing and the valve to automatically operate the latter by the movement of the burner.

3. In apparatus of the class described, the combination of a gas-pressure-operated device having an element movable by gas-pressure in one direction, a burner movable with said movable element and having a valve disposed externally of the casing, and a connection between the valve and a relatively fixed element to operate the valve automatically by the movement of the burner.

4. In apparatus of the class described, the combination of a movable burner having a valve provided with an operating-arm, a link connected to said operating-arm, and a pivoted element adjustable on said link.

5. In apparatus of the class described, the combination of a burner, a gas-pressure-operated device to automatically control the supply of gas to the burner, means including a valve to supply gas to said device, and an exhauster having an actuating element automatically controlled by said valve to exhaust gas from the device when the supply of gas thereto has been cut off.

6. In apparatus of the class described, a gas-pressure-operated device having a flexible wall of substantially truncated conical form, and means to supply gas thereto through its smaller end and to exhaust gas therefrom, for the purpose set forth.

In testimony whereof I have hereunto set my hand in presence of two subscribing witnesses.

ELI H. STOW.

Witnesses:
J. C. WILLSON,
L. WENTZELL.